(12) United States Patent
Demeilliez et al.

(10) Patent No.: US 11,160,139 B2
(45) Date of Patent: Oct. 26, 2021

(54) METHOD FOR OPTIMIZING PER MESSAGE TYPE DATA EXCHANGE BETWEEN CONNECTED OBJECTS

(71) Applicant: BULL SAS, Les Clayes-sous-Bois (FR)

(72) Inventors: Bruno Demeilliez, Saint Laurent du Pont (FR); Gilles Menigot, Froges (FR); Wajih Chaabane, Chambery (FR)

(73) Assignee: Bull SAS, Les Clayes-sous-Bois (FR)

( * ) Notice: Subject to any disclaimer, the term of this patent is extended or adjusted under 35 U.S.C. 154(b) by 47 days.

(21) Appl. No.: 16/691,109

(22) Filed: Nov. 21, 2019

(65) Prior Publication Data
US 2020/0170078 A1 May 28, 2020

(30) Foreign Application Priority Data

Nov. 23, 2018 (FR) .................................... 1871803
Dec. 21, 2018 (FR) .................................... 1874080

(51) Int. Cl.
| | |
|---|---|
| *H04W 88/16* | (2009.01) |
| *H04L 12/66* | (2006.01) |
| *H04W 4/12* | (2009.01) |
| *H04W 48/08* | (2009.01) |
| *H04W 74/08* | (2009.01) |
| *H04W 84/18* | (2009.01) |

(52) U.S. Cl.
CPC ............. *H04W 88/16* (2013.01); *H04L 12/66* (2013.01); *H04W 4/12* (2013.01); *H04W 48/08* (2013.01); *H04W 74/0866* (2013.01); *H04W 84/18* (2013.01)

(58) Field of Classification Search
CPC ....... H04W 88/16; H04W 4/12; H04W 48/08; H04W 74/0866; H04W 84/18; H04L 12/66

USPC .................................. 370/328, 329; 455/436
See application file for complete search history.

(56) References Cited

U.S. PATENT DOCUMENTS

| | | | |
|---|---|---|---|
| 7,920,579 B2* | 4/2011 | Zhu ...................... | H04L 12/185 370/401 |
| 2016/0018043 A1 | 1/2016 | Richards, Jr. | |
| 2017/0134927 A1* | 5/2017 | Lee .......................... | H04W 4/00 |
| 2021/0176649 A1* | 6/2021 | Rahman ................ | H04W 28/16 |

FOREIGN PATENT DOCUMENTS

CN            102685839 A     9/2012

\* cited by examiner

*Primary Examiner* — Congvan Tran
(74) *Attorney, Agent, or Firm* — Arc IP Law, PC; Joseph J. Mayo

(57) ABSTRACT

The invention relates to a method for optimizing the use of gateways according to a category of message to be sent by a connected object capable of accessing several gateways. The method includes in particular:
- a discovery procedure (100) comprising broadcasting (120), by the connected object, a query message (BCM), and receiving (130), by the connected object, response messages (131, 132) sent by each of the available gateways in response to the query message (BCM);
- a procedure (200) for assigning priority levels to the available gateways per category of message to be sent; and
- a procedure for ranking (300), by the connected object, the available gateways in order of their respective priority levels depending on the category of message to be sent, with the objective of choosing one of said available gateways for sending data messages.

15 Claims, 4 Drawing Sheets

METHOD FOR OPTIMIZING PER MESSAGE TYPE DATA EXCHANGE BETWEEN CONNECTED OBJECTS

Figure 1:
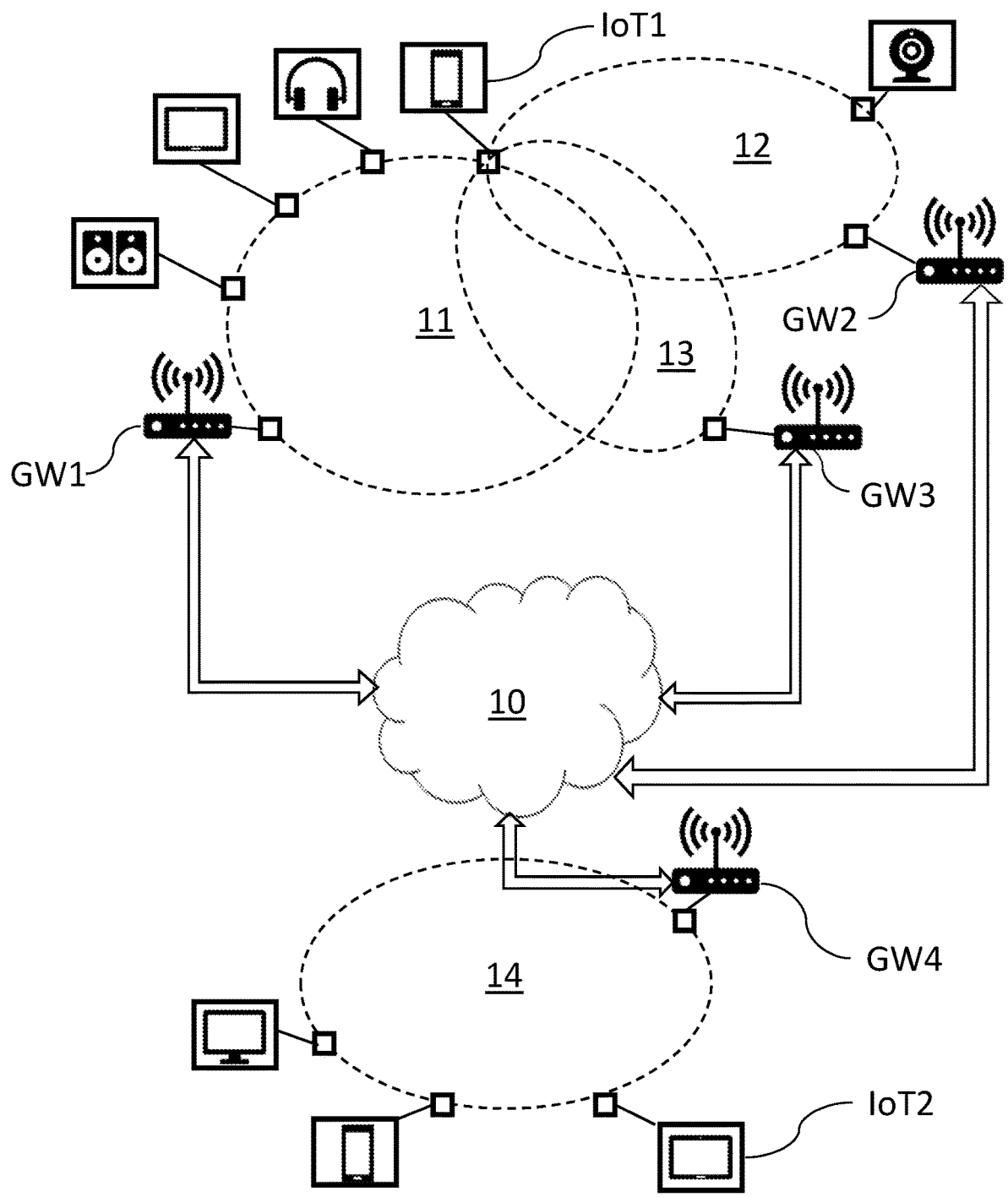

The present invention relates to the field of connected objects and, in particular, to the exchange of data in a network infrastructure comprising connected objects. The invention relates in particular to a method for optimizing the use of connection gateways depending on a category of message to be sent by a connected object, as well as to a communication system capable of implementing the method, a computer program with instructions for implementing the method, and a recording medium for said computer program.

PRIOR ART

Historically, addressable entities on the Internet were only digital information elements, such as HTML pages, or other files accessible online, and identifiable by website URL addresses, for example. Considered as the third Internet revolution, the Internet of Things or IoT (in English, the "Internet of Things", or IoT) can be seen as the extension of the Internet to physical elements.

The Internet of Things refers to all objects connected to the Internet and corresponds to the rapidly expanding field of Information and Communication Technologies (ICT). The electronic devices concerned by these applications are called connected objects, in the sense that they can interact through a plurality of local sub-networks that can be connected to a high-speed core network, such as the Internet. Thus, a definition of the Internet of Things is proposed in the book L'INTERNET DES OBJETS, by Pierre-Jean Benghozi, Sylvain Bureau, and Françoise Massit-Folléa published by Editions de la Maison des sciences de l'homme, Chapter 1, pages 15-23, as "a network of networks that allows, through standardized and unified electronic identification systems, and mobile wireless devices, to directly and unambiguously identify digital entities and physical objects, and thus to be able to retrieve, store, transfer and process, without discontinuity between the physical and virtual worlds, the related data".

The uses of connected objects are very varied and can range from the field of e-health to that of home automation, including mobile phones. Connected objects invade our daily lives a little more and more every day, and they are also involved in the concept of the intelligent environment, and in particular of a Smart City (or "Smart City" in English), monitoring (in English: "monitoring") of industrial installations, transport and logistics, autonomous cars, agriculture, etc. In 2015, there were 4.9 billion "connected objects". We are talking about 25 to 150 billion connected objects in 2025. In addition to this exponential growth, there is a great diversity of application fields: health, transport, commerce, home automation . . . .

This number and this diversity represent a real technical challenge for the data transport of all these connected objects. In particular, the connectivity between them or to the Internet of these connected objects may vary over time. In some cases, the connectivity may not be permanent, and may evolve due to, for example, a hardware or software problem affecting a gateway. In other cases, it can be multiple, that is to say it may be carried out simultaneously by more than one Internet connection gateway, in particular with the implementation of the concept of link aggregation.

Communication methods for connected objects were proposed in which a connection gateway was configured to determine a first communication path and first communication resources between the source terminal and the recipient terminal (CN102685839). A method has also been proposed for assigning a gateway depending on the characteristics of the connected object concerned (US2016/018043).

However, to date, there is no solution to dynamically manage the connectivity of an object connected to sub-networks, more or less available, depending on the needs thereof in order to optimize the communication of objects connected to the outside of the sub-network (for example via the Internet).

Thus, there is a need for new methods or systems for exchanging data in a network infrastructure comprising connected objects.

Technical Problem

The invention aims to overcome the disadvantages of the prior art. In particular, the invention aims to provide a method for optimizing the use of gateways depending on the category of message to be sent by a connected object that allows self-adaptation, on the one hand, to the characteristics of the message to be sent and, on the other hand, to the connectivity characteristics of the sub-networks including the evolutivity or time fluctuation of this connectivity. The invention also aims to provide gateways, connected objects, and a data communication system capable of implementing auto-adaptive use of sub-networks over time and depending on the needs of the connected object.

BRIEF DESCRIPTION OF THE INVENTION

To this end, a first aspect of the invention provides a method for optimizing the use of gateways depending on a category of message to be sent by a connected object, said connected object being able to access several gateways adapted for transmitting a message sent by the connected object, said optimization method comprising:
  a procedure for discovering, by the connected object, gateways available for the connected object, said discovery procedure comprising:
    broadcasting, by the connected object, a query message in several data transport sub-networks, and
    receiving, by the connected object, response messages sent by each of the available gateways in response to the query message, said response messages containing gateway connectivity parameters and a validity period value of said connectivity parameters;
  a procedure for assigning priority levels to the available gateways per category of message to be sent, said procedure for assigning priority levels comprising executing, by the connected object, at least one prioritization function, for calculating priority levels for each gateway from the connectivity parameters and depending on the category of message to be sent; and
  a procedure for ranking, by the connected object, the available gateways in order of their respective priority levels depending on the category of message to be sent, with the objective of choosing one of said available gateways for sending data messages.

The method according to the invention allows, on the one hand, to optimize the use of gateways depending on the messages to be sent and, on the other hand, to dynamically manage the connectivity evolution of sub-networks, for example following a hardware or software problem. Thus, thanks to the invention, it is possible to carry out auto-adaptive routing, optimize the cost of transporting messages, and manage the validity period of transmitted messages. In addition, the method according to the invention allows to take advantage of the multiplicity of the gateways to the Internet and the evolution over time of their connectivity. The inventors therefore provide a solution for meeting connectivity challenges by providing a method adaptable to the diversity of connected objects, but also able to cover all deployed connected objects, whether they are directly accessible by a centralized system or not.

According to Other Optional Characteristics of the Method:

it further comprises, when the connected object then called the "sender" initiates a step of sending a data message, categorizing the message to be sent by the sender connected object, for assigning a category value to said message, and transmitting the data message by the sender connected object to the available gateway which has the maximum priority level for the category of the message to be sent. Thus, it is the connected object that determines, depending on the parameters of the message be sent thereof, which gateway will be the most suitable;

it also includes a step of updating the priority levels, said updating step including, following a query by the connected object, broadcasting or transmitting, by at least some of the available gateways, new connectivity parameters to the connected object, and automatically updating the priority levels of said available gateways by the connected object. Thus, the connected object has up-to-date priority levels for each category and does not have to wait for information to be transmitted from the gateways when sending messages. It can therefore quickly identify the most efficient gateway at a given time;

In particular, the updating step may include sending by the connected object an update message to at least some of the available gateways, the recipient gateways being selected depending on the validity period value of the connectivity parameters associated therewith. This limits data traffic on the sub-network, and allows only key data to be exchanged;

the priority levels of the available gateways per message category are stored in a memory of the connected object;

the priority levels of the available gateways per message category are transmitted by the connected object to other connected objects. This allows to share between connected objects a same distribution of the priority gateways per category of message to be sent;

the connectivity parameters specific to each gateway which are taken into account, by the connected object, for calculating the priority levels, include: a connectivity type, a data transport cost per unit of data, a connectivity quality index, a latency time, and/or a transmission rate associated with the gateway of the network. Thus, the connected object can select a gateway offering the best quality of service for the message category considered; and/or the message characteristics specific to each message to be sent and taken into account by the connected object for categorizing the message, include: the size of the message, an index relating to the urgency of the message, and/or the format of any objects associated with the message. The use of such data, which is easy to extract, facilitates the implementation of the method.

it includes, when the connected object initiates a procedure for sending a request:

a procedure for categorizing messages to be transmitted, including categorizing the request to be sent by the connected object so as to define a category value of the request and categorizing a response expected by the connected object so as to define a category value of the response, the categorizations including executing, by the connected object, at least one categorization function, for calculating the category values of the request and the response from message parameters of said request and said response, and transmitting the request by the connected object to an available gateway having a maximum priority level for the category value of the request, said transmitted request including an identifier of the gateway to be used for the transmission of the response to the connected object, said identifier corresponding to a gateway having a maximum priority level for the category value of the response. This allows to optimize the use of the gateways depending on the messages, on the one hand, to be sent, and on the other hand, to be received. Thus, the routing of messages is adapted to the nature of the streams (uplink/downlink) and the characteristics of the gateways. Thus, it is possible to perform auto-adaptive routing, network congestion relief and message transport cost optimization. Indeed, some communication networks will be particularly adapted to a certain category of uplink message while others will be more adapted to another category of downlink message. Gateways are then optimally used depending on the characteristics of the messages transmitted, unlike previous systems providing a single predefined path or routing.

the transmitted request further includes a time indication corresponding to a period during which the response must be transmitted. This is particularly advantageous when connected objects are programmed to be connected only occasionally. Thus, the response message can be transmitted later during a period during which the connected object will be accessible;

it includes a prior procedure for assigning, by each of the gateways, a fixed IP address to the connected object and a dedicated port to said fixed IP address and all messages received on said dedicated port are transmitted to the connected object to the previously assigned fixed IP address. This makes transmitting the response to the connected object easier. Particularly in this case, the transmitted request includes the port dedicated to the connected object of the gateway to be used for the transmission of said response.

the message characteristics specific to each message to be transmitted and taken into account by the connected object for categorizing the message, include: the size of the message, an index relating to the urgency of the message, and/or the format of any objects associated with the message. The use of such data, which is easy to extract, facilitates the implementation of a method according to the invention.

According to another aspect, the invention relates to a connected object adapted to be connected to several sub-networks, the connected object being further adapted, and preferably configured, to implement a method for optimizing the use of available gateways depending on a category of message to be sent, and comprising to this end:

a discovery module including:
means for broadcasting a query message in the available sub-networks; and
means for receiving a response message sent by each of the available gateways in response to the query message, said response message containing gateway connectivity parameters and a validity period value of said connectivity parameters;

a module for assigning priority levels, to the available gateways, per message category, including a processor for executing at least one prioritization function, for calculating priority levels for each available gateway from the connectivity parameters and depending on the category of message to be sent; and a module for ranking the available gateways in order of their respective priority levels depending on the category of message to be sent, with the objective of choosing one of said available gateways for sending data messages.

In addition, the connected object according to the invention may include a priority access management module including means for categorizing a message to be sent, configured to assign a category value to said message, and transmission means configured to transmit the message to be sent to the available gateway which has the maximum priority level for the category value of the message to be sent.

The connected object according to the invention allows to use the gateways in an optimized way depending, on the one hand, on the messages to be sent and, on the other hand, on the evolution of the sub-network connectivity. In addition, the connected object has the advantage of being able to operate with conventional gateways since calculations are performed at the connected object based on transmitted characteristics. Thus, thanks to the invention, it is possible to carry out auto-adaptive routing, optimize the cost of transporting messages, and manage the validity period of transmitted messages. In addition, such a connected object according to the invention allows to take advantage of the multiplicity of the gateways to the Internet and the evolution over time of their connectivity.

According to another aspect, the invention relates to data communication system comprising a connected object according to the invention, said system further including gateways accessible by said connected object for transmitting a message and wherein the gateways are configured to send a response message in response to the query message of the connected object, said response messages containing gateway connectivity parameters and a validity period value of said connectivity parameters.

Figure 2A:
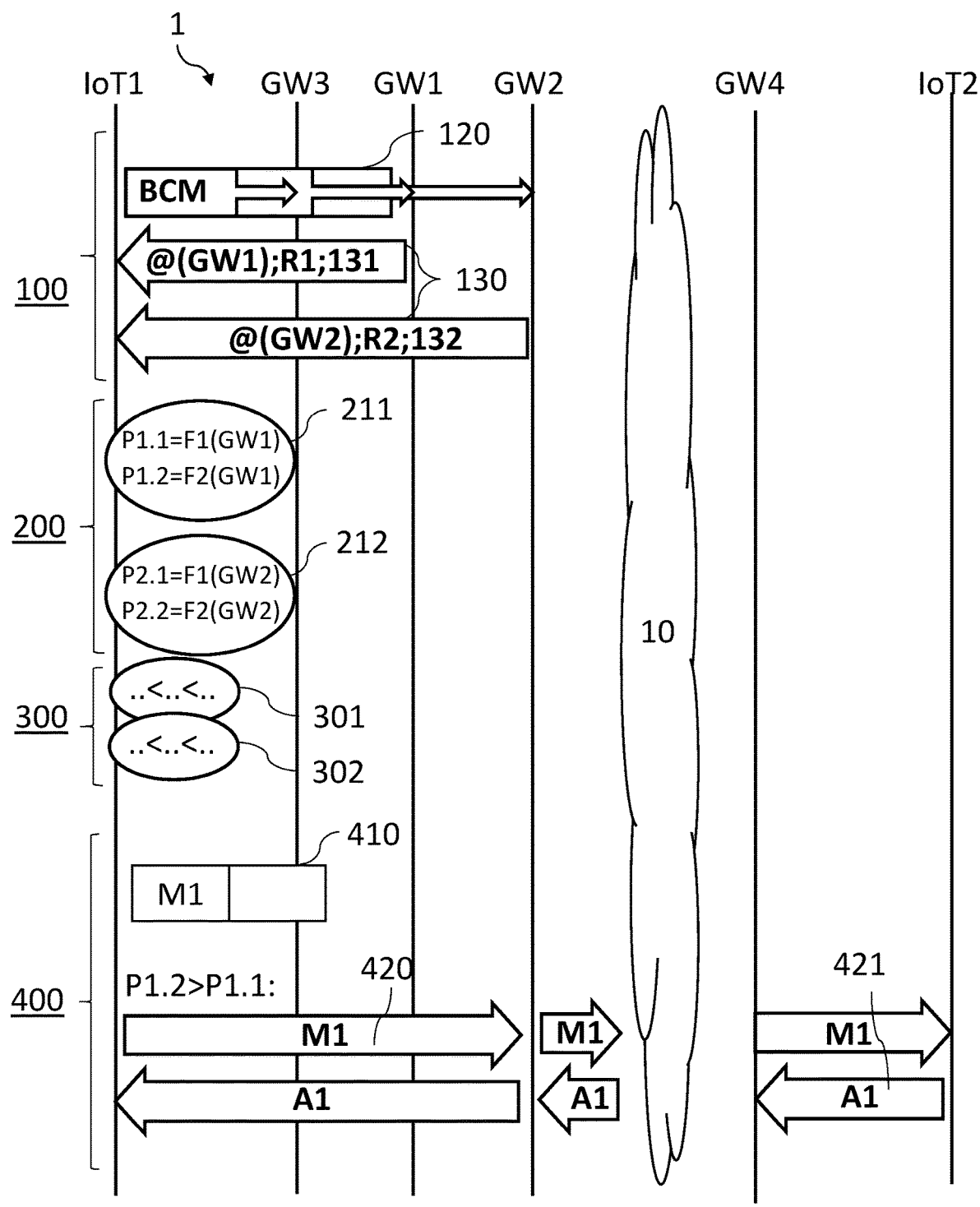
Figure 2B:
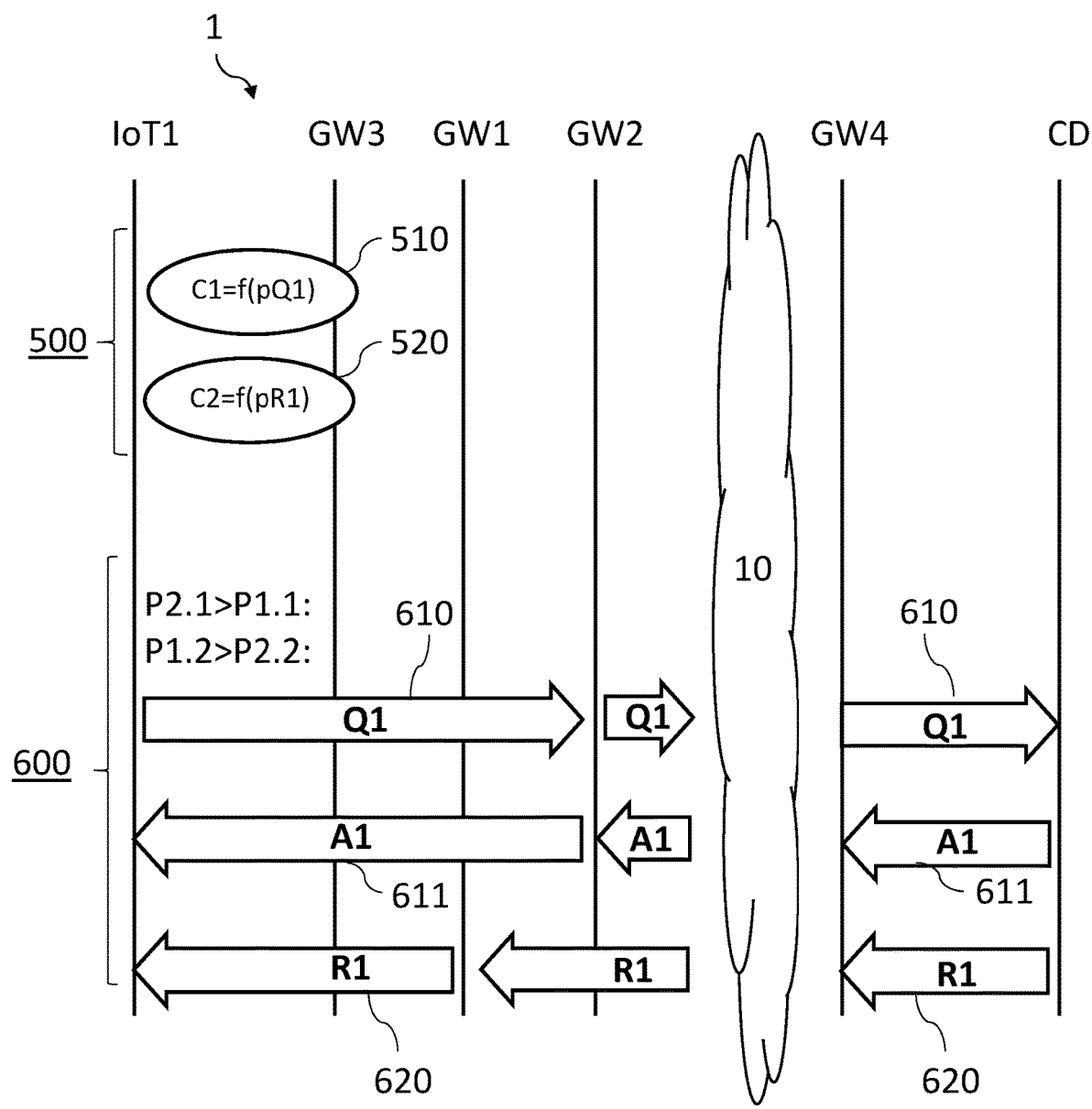
Figure 3:
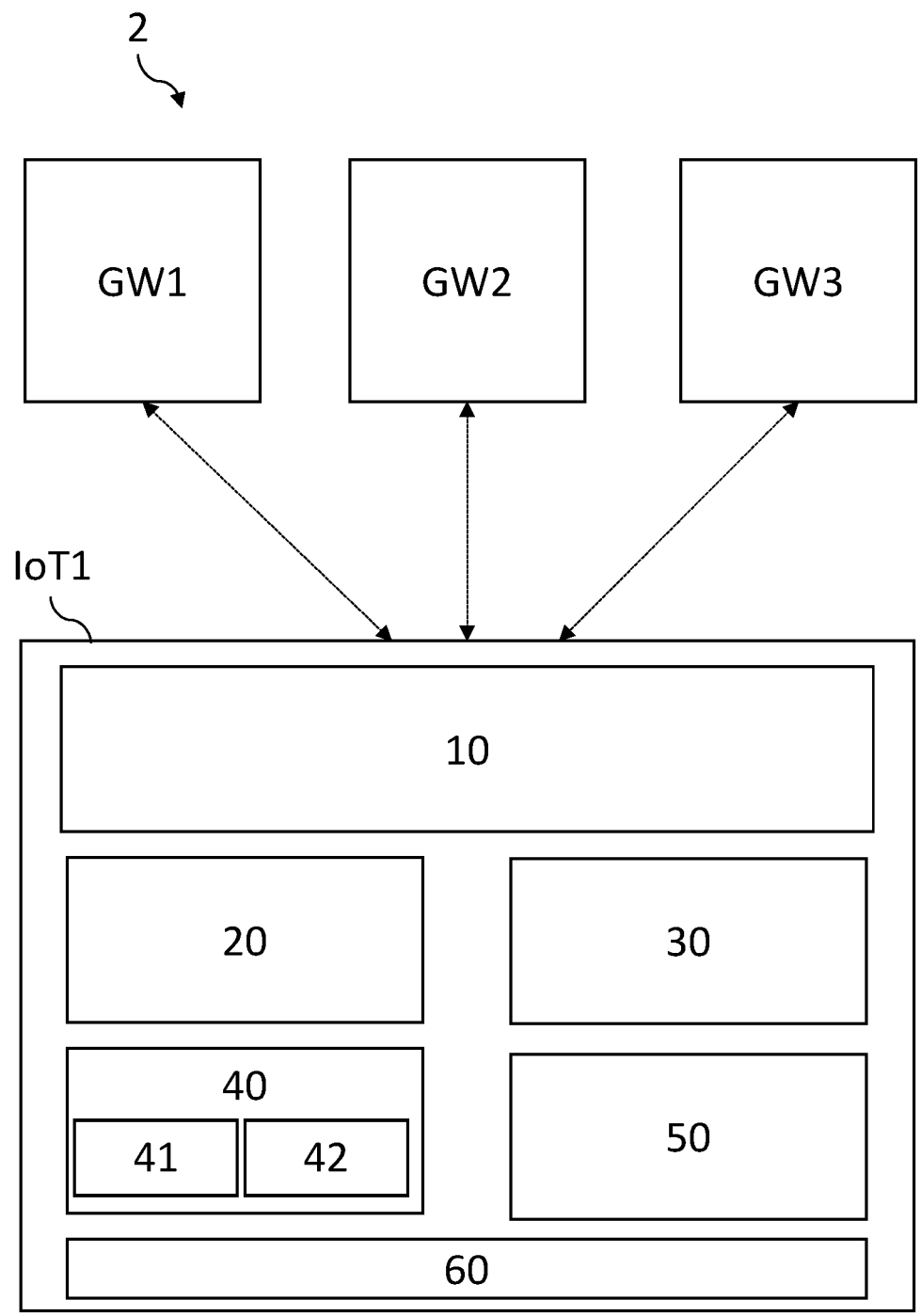

Other advantages and characteristics of the invention will appear upon reading the following description given by way of illustrative and non-limiting example, with reference to the appended figures:

FIG. 1 represents a diagram showing a local network architecture comprising several connected objects, one connected object of which can use several local networks;

FIGS. 2A and 2B, two functional diagrams illustrating the exchanges between gateways and two connected objects of the architecture of FIG. 1, in embodiments of a method according to the invention; and, FIG. 3 represents a diagram showing the architecture of a gateway and an object connected according to an embodiment of the invention.

DESCRIPTION OF THE INVENTION

In the following description, a "connected object" is an electronic device or system connected, preferably wirelessly, to a network and capable of sharing information with a server, a computer, a tablet, a smartphone, or any other electronic device.

The expression "sub-network" or "local network", within the meaning of the invention, corresponds, for example, to local networks each served by at least one gateway connecting to another network such as the Internet and to which connected objects are connected.

The expression "main network", within the meaning of the invention, is a wide-area, high-speed network using a reliable transport protocol in connected mode, such as the TCP/IP (TCP or "Transmission Control Protocol" being a 4 layer protocol of the OSI or "Open Systems Interconnection" model according to Anglo-Saxon terminology, over IP which is a 3 layer protocol of the OSI model) protocol. The TCP/IP protocol is documented in IETF ("Internet Engineering Task Force" according to Anglo-Saxon terminology) RFC 7931. This could be, for example, an Internet network.

By "gateway" or "connection gateways" is meant, within the meaning of the invention, equipment for providing the connection between equipment belonging to different networks, for example, providing the connection of equipment in a local network (local IP, for "Internet Protocol" in Anglo-Saxon terminology, addresses) and Internet services (public IP addresses). As a result, it has both types of IP addresses. Its public IP address, assigned by the Internet service provider, more commonly referred to as the acronym "ISP", allows it to exchange data with the Internet network. Its local IP address allows it to exchange data with local network equipment. It is generally specific and assigned by default by the ISP.

By "priority levels" or "priority level" is meant an increasing scheduling P1 to Pn according to characteristics such as connectivity type, transport cost, connectivity quality index, etc. . . . for calculating a priority value corresponding to the priority level of each gateway. In other words, if P2>P1, then the gateway with a priority level P2 will have priority over the gateway with a priority level P1.

The expression "prioritization function", within the meaning of the invention, may correspond to a protocol or a series of instructions for calculating a priority level based on given priority values and according to a predetermined function or formula.

The expression "categorization function", within the meaning of the invention, may correspond to a protocol or a series of instructions for calculating a category assignable to a message to be sent from message characteristic values and according to a predetermined function or formula. In addition, the number and characteristics of categories can be predetermined and stored within a repository stored at the connected object.

Within the meaning of the invention, "query message" corresponds to a message of the BCM ("Broadcast Message" in Anglo-Saxon terminology) type broadcast by a connected object to gateways and/or other connected objects of the local network.

Within the meaning of the invention, "response message" corresponds to a message sent by one or more gateways in response to a query message and including an identifier as well as gateway connectivity parameters and a validity period value of said connectivity parameters.

Within the meaning of the invention, "data message" corresponds to a message sent between two connected objects through at least one gateway and comprising data from a connected object.

Within the meaning of the invention, "presentation message" corresponds to a message sent by one or more gateways in response to a query message and including an identifier as well as gateway connectivity parameters and a validity period value of said connectivity parameters.

By "process", "calculate", "determine", "display", "extract", "compare" or more broadly "executable operation" is meant, within the meaning of the invention, an action performed by a device or a processor unless the context indicates otherwise. In this regard, the operations relate to actions and/or processes of a data processing system, for example a computer system or an electronic computing device, which manipulates and transforms the data represented as physical (electronic) quantities in the memories of the computer system or other devices for storing, transmitting or displaying information. In particular, calculation operations are carried out by the processor of the device, the produced data are entered in a corresponding field in a data memory and this field or these fields can be returned to a user for example through a Human Machine Interface formatting such data. These operations may be based on applications or software.

The terms or expressions "application", "software", "program code", and "executable code" mean any expression, code or notation, of a set of instructions intended to cause a data processing to perform a particular function directly or indirectly (for example after a conversion operation into another code). Exemplary program codes may include, but are not limited to, a subprogram, a function, an executable application, a source code, an object code, a library and/or any other sequence of instructions designed for being performed on a computer system.

By "processor" is meant, within the meaning of the invention, at least one hardware circuit configured to perform operations according to instructions contained in a code. The hardware circuit may be an integrated circuit. Examples of a processor include, but are not limited to, a central processing unit, a graphics processor, an application-specific integrated circuit ("ASIC" according to Anglo-Saxon terminology), and a programmable logic circuit. A single processor or several other units may be used to implement the invention.

By "coupled" is meant, within the meaning of the invention, connected, directly or indirectly, with one or more intermediate elements. Two elements may be coupled mechanically, electrically or linked by a communication channel.

The expression "human-machine interface", within the meaning of the invention, corresponds to any element allowing a human being to communicate with a computer, in particular and without that list being exhaustive, a keyboard and means allowing in response to the commands entered on the keyboard to perform displays and optionally to select with the mouse or a touchpad items displayed on the screen. Another embodiment is a touch screen for selecting directly on the screen the elements touched by the finger or an object and optionally with the possibility of displaying a virtual keyboard.

In the claims, the term "comprise" or "include" does not exclude other elements or other steps.

In the following description, the same references are used to designate the same elements. The reference signs cannot be understood as limiting the scope of the invention. In addition, the various characteristics presented and/or claimed may be advantageously combined. Their presence in the description or in different dependent claims, do not exclude this possibility.

Objects in our daily lives or in our industries are more and more often connected and able to exchange data with other devices. In addition, there are more and more connected objects with a plurality of functionalities where each of said functionalities will not have the same hardware needs and in particular connectivity needs. Thus, a mobile communication device, such as a mobile phone, can be used to establish voice communications, stream video downloads, send files of a few kilobytes or on the contrary very large files. In addition, to this end, the mobile communication device will have at its disposal several communication networks operating according to different protocols: WIFI, LTE, UMTS . . . . However, today, there is no solution to manage, in a dynamic way, the use of sub-networks depending on the category of message to be sent by a connected object in order to allow for an optimized connectivity of the connected object depending on the needs thereof. Thus, the inventors have developed a new method 1 for optimizing the use of gateways and more broadly sub-networks depending on the category of message to be sent. In particular, the inventors have developed a method for optimizing the use of gateways depending on a category of message to be sent by a connected object able to access several gateways belonging for example to several sub-networks. With the message to be sent for example intended for other connected objects, but also for servers or other IT structures.

The invention will be described in the context of a main network, and sub-networks. The invention is not, however, limited to this example, and can find applications in any configuration in which there are several sub-networks available for a same connected object (IoT1).

With reference to the diagram in FIG. 1, a local network architecture to which the method of the invention can advantageously be applied comprises several sub-networks such as a first sub-network 11, a second sub-network 12, and a third sub-network 13, which are separate and to which a connected object IoT1 is connected, each of these sub-networks being connected to the main network 10. The main network 10 in the example shown is the Internet network. The main network 10 being itself connected to a sub-network 14.

The sub-network 11 includes at least one connection gateway, such as the Internet connection gateway GW1 in the example shown. Similarly, the sub-networks 12, 13, 14 each include at least one connection gateway such as the connection gateways GW2, GW3, and GW4 in the example shown.

Each of the local networks 11, 12, 13, and 14 includes one or more connected objects, such as the connected object IoT1 of the local network 11 shown, and the connected object IoT2 of the local network 14 shown, respectively. These connected objects can be, but are not limited to: a connected mobile phone, a connected tablet, a connected laptop, connected speakers, a connected headset, a connected camera, etc. The invention does not intend to be limited, either by the number or by the nature of the objects thus connected to the sub-networks 11, 12, 13, and 14. It can be any physical object, place or person identified by RFID chips, for example, or a bar code, an EAN ("European Article Numbering") code, an EPC ("Electronic Product Code") code, etc. Each object is identified by a unique individual code that distinguishes it from all others within the local network concerned.

It should be noted that the identification of the objects follows a strong trend, in the context of the emergence of IoT, towards the assignment of a unique IP address specific to each connected object. Therefore, in the following, it will be considered as necessary that the unique identifier of each connected object in each sub-network is an IP address. However, this is not a prerequisite for the embodiments of a method according to the invention. Indeed, the interface between the connected objects of the local networks and other sub-networks or the Internet network, the connections of which are IP connections, is provided by the gateways GW1, GW2, GW3, and GW4 shown in FIG. 1, which can manage a conversion or correspondence of addresses between, on the one hand, any address space of a sub-network and, on the other hand, the IP address space of a main network (for example, the Internet).

The sub-networks 11, 12, 13, and 14 can be networks specifically dedicated to the connected objects such as:
- a Sigfox network;
- a LoRa network using the LoRaWAN (acronym for "Long Range Wde-area Network" according to Anglo-Saxon terminology) protocol which, as its name suggests, is a long-range wide area network;
- or networks based on another wireless protocol by radio waves such as:
- a personal area network (or WPAN, from the English "Wireless Personal Area Network") such as a ZigBee network based on the IEEE 802.15.4 standard;
- a Wi-Fi network; or a Bluetooth network (IEEE 802.15.1 standard); etc.

The present invention presents as a mechanism for transporting data (namely data message) from IoTs in a first sub-network, in particular from IoT1, to other IoTs in one or more different sub-networks. In data communications networks, the purpose of the transport layer protocols is thus to transport data from one application to another (also referred to as application programs), which run on respective host machines and potentially in respective local networks remote from each other, and connected together via a wide area network such as the Internet.

In particular, as shown in FIG. 1, one of the connected objects IoT1 is able to connect to the three sub-networks 11, 12, 13 each having a connection gateway. Thus, the connected object has several solutions to access remote sub-networks such as the sub-network 14 shown.

Embodiments of a method according to the invention will now be described with reference to the functional diagram in FIG. 2. To this end will be considered a use case in which the connected object IoT1 in FIG. 1 must send data to the connected object IoT2 in the local network 14. To this end, the method according to the invention allows the available connection gateway, which offers the best performance considering the category of message to be sent, to be used at all times. The connected object IoT1 is for example able to connect to three communication networks: optical fiber, 4G, and ADSL. Indeed, depending on the message to be sent, it will not necessarily be the same gateway that will be the most appropriate.

To obtain this result, the method 1, implemented by a connected object IoT1, first of all, comprises a procedure 100 for discovering available gateways for said connected object IoT1, namely the gateways GW1 and GW2 in the example shown in FIG. 2; then a procedure 200 for assigning priority levels to the available gateways per category of message to be sent, and finally a ranking 300, by the connected object IoT1, of the available gateways GW1 and GW2 in order of their respective priority levels depending on the category of message to be sent.

In addition, the method 1 according to the invention may include a step of sending 400 a data message M1 by the connected object IoT1. This sending step 400 can include an exchange of data messages and corresponding acknowledgment messages, for sending data from the object IoT1 to the object IoT2, through one of the gateways GW1 and GW2 of the local network 11, the main network 10, and the gateway of the local network 14.

In embodiments, the discovery procedure 100, the priority level assignment procedure 200 and/or the ranking procedure 300 are initiated each time the connected object IoT1 connects to a new local network. Similarly, these discovery 100, priority level assignment 200 and/or ranking 300 procedures can be triggered in response to the detection of the disconnection of the connected object from a sub-network to which it was connected, due to a hardware failure for example, or a software update. This allows to adapt the priority levels respectively associated with the available gateways for the connected object IoT1, which are used by the latter as will be explained below, to the evolution of gateway connectivity.

Let us start by explaining the procedure 100 for discovering, by a connected object IoT1, available gateways for the connected object, as applied to the gateways GW1, GW2, and GW3, according to the example shown.

This procedure 100 for discovering available gateways may initially include connecting the connected object to available sub-networks. The different steps and particular characteristics of this connection will depend on the sub-networks concerned. For example, the connection may include the steps of initially attaching, authenticating, and assigning an IP address.

As illustrated, the discovery procedure 100 includes broadcasting 120, by the connected object IoT1, a query message (BCM message, for "Broadcast Message" in the rectangular arrow symbolizing the broadcasting step 120 in FIG. 2) in several data transport sub-networks 11, 12, 13. This BCM message is then received by the gateways GW1, GW2, and GW3 that are connected to the local networks 11, 12, and 13, as shown in FIG. 1, and also by the other connected objects of the local networks 11, 12, and 13.

In response, the connected object IoT1 receives a response message sent by each available connection gateway that has received a query message. In addition, the connected object can also receive a response message from the other IoTs containing an identifier of one of said other connected objects. Thus, in particular, the response message 131 returned by the gateway GW1 to the connected object IoT1 includes, on the one hand, an identifier of the gateway GW1 (for example its IP address noted @(GW1) in the arrow symbolizing the message 131 in FIG. 2) and, on the other hand, connectivity parameter values of the gateway GW1 and a validity period value of said connectivity parameters (noted R1 in FIG. 2). Similarly, the response message 132 returned by the gateway GW2 to the connected object IoT1 includes, on the one hand, an identifier of the gateway GW2 (for example its IP address noted @(GW2) in the arrow symbolizing the message 132 in FIG. 2) and, on the other hand, connectivity parameter values of the gateway GW2 and a validity period value of said connectivity parameters (noted R2 in FIG. 2). In the example shown in FIG. 2, the gateway GW3 is not active at the time the BCM is sent and it has not sent a response message.

The method 1 according to the invention also includes a procedure 200 for assigning priority levels to the available gateways GW1, GW2 per category of message to be sent. This procedure is preferably performed by the connected object IoT1. Thus, it is not necessary to configure each of the available gateways, but only the connected object IoT1 wishing to benefit from the method according to the invention.

In particular, and as illustrated in FIG. 2, the procedure 200 for assigning priority levels includes executing 211, 212, by the connected object, at least one prioritization function. This at least one prioritization function allows to calculate, from the connectivity parameters, several priority levels for each of the connection gateways, each priority level corresponding to a category of message to be sent. In particular, the assignment procedure 200 may include executing a prioritization function per message category. In particular, executing the at least one prioritization function allows to calculate at least two priority levels per gateway, each of the calculated priority levels being associated with a category of message to be sent. Preferably, it allows at least four priority levels per gateway to be calculated, even more preferably at least six priority levels per gateway.

In an exemplary embodiment of a method according to the invention, two prioritization functions F1 and F2 were stored by the connected object IoT1 for use by said connected object for calculating two priority levels (namely, one per message category) for each of the available gateways based on the connectivity characteristics of the gateways. Alternatively, a prioritization function could be used if, for example, it contains a variable referring to the message category and can therefore produce several priority levels. In FIG. 2, these calculations have been symbolized in the balloons illustrating the steps 211 and 212, respectively, by the expressions P1.1=F1(GW1), P1.2=F2(GW1), P2.1=F1 (GW2), and P2.2=F2(GW2), respectively. These calculations therefore use functions F1 and F2 based on the connectivity characteristics of each gateway GW1 and GW2. Thus, the priority levels P1.1, P1.2, P2.1, and P2.2 that are obtained are truly comparable values in this case two by two. In this example, in the case of a message category 1, the priority levels P1.1 and P2.1 will apply, while the priority levels P1.2 and P2.2 will apply in the case of a message category 2.

In a non-limiting exemplary embodiment of a method according to the invention, the connectivity characteristics, specific to each gateway that are taken into account for calculating their priority level, include in particular, but are not limited to:
- a type of connectivity, for example, whether it is a wired network, a 3G, or 4G-LTE network, a short-range network, such as or Bluetooth, etc;
- a data transport cost per unit of data, expressed for example per Kilobyte of data transported;
- a connectivity quality index, for example an average bit error rate, an observed latency time, and/or a transmission rate associated with the gateway considered; etc . . . .

Advantageously, the connectivity characteristics specific to each gateway include at least one index representative of the message transmission failure rate by each gateway. Preferably, it is a representative index of the message transmission failure rate per message category by each gateway. The message transmission failure rate is a data item that gateways are generally able to memorize. The index representing the message transmission failure rate per message category can, for example, be generated by the connected object.

In general, these characteristics reflect the performance of IP connections established through the concerned gateway in terms of quality of service (QoS), assessed in terms of transmission rate, latency, retransmission rate, etc . . . .

In addition, the validity period value of said connectivity parameters can be taken into account in the prioritization function and/or associated with the calculated priority level.

Then, the method according to the invention includes a procedure 300 for ranking the available gateways GW1 and GW2 in order of their respective priority levels depending on the category of message to be sent. This procedure is preferably performed by the connected object IoT1. This ranking procedure 300 allows to select one of said available gateways for sending data messages or, more broadly, for establishing an order of preference for the transmission of a given category of message. The ranking procedure 300 includes, for example, a first ranking 301 of the gateways for a first message category, and then a second ranking 302 of the gateways for a second message category. As mentioned above, data messages can be sent, for example, to other connected objects or systems belonging to another sub-network or other sub-networks.

Of course, these procedures can also be implemented by other connected objects and in the other sub-networks such as the local network 14, regardless of its implementation by the connected object IoT1.

In alternative embodiments, the method includes an automatic update of the priority level of at least some of the gateways of the network. For example, the automatic update of the priority level, per message category, of the gateways is performed periodically, at a frequency that can be programmed at the level of the connected object.

The method can advantageously include a periodic repetition of the procedures 100, 200, 300 by the connected object IoT1. Alternatively, the distribution can depend on the connection of the connected object IoT1 to new sub-networks. Advantageously, updating the priority levels can be triggered by the connected object IoT1 depending on the validity period value of the connectivity parameters of the connection gateways.

For example, the automatic update of the priority levels of the gateways is performed periodically, at a frequency that can be programmed at each connected object, by recalculating using the same one or more priority formulas F1, F2 as stored at the connected object, but applied to updated values of the connectivity characteristics of the available gateways at the time of the update.

The one skilled in the art will appreciate that a method according to the invention, and in particular a procedure for assigning priority levels, can be applied to all or part of the connection gateways to which the connected object IoT1 can connect.

The method may also involve the gateways broadcasting or transmitting their updated connectivity characteristics to one or more connected objects. Broadcasting or transmitting is carried out by at least some gateways, for example at least two gateways, so that the choice is left to the connected object. This allows to adapt, to the evolution of the gateway operating conditions, the priority levels associated with the gateways, respectively, and which are used by the connected object IoT1 as explained below.

The one skilled in the art will appreciate that the method according to the invention and in particular the procedure 200 for assigning priority levels can be applied to all or part of the connection gateways to which the connected object IoT1 can connect. The assignment procedure 200 can also be implemented in the other sub-networks such as the local network 14, regardless of its implementation in the local network 11.

FIG. 2 also illustrates what happens when the connected object IoT1 sends a data message to another connected object, in this case to the connected object IoT2 of the local network 14. This is the step of sending 400 a data message M1 by the connected object IoT1.

This sending step 400 includes, and generally begins with, categorizing 410 the message to be sent by the sender connected object IoT1. Such a categorization allows to assign a category value to said message. This categorization can be done, for example, depending on several message parameters, such as the size of the message to be sent, a type of application wishing to send the message (identified for example by an application code), the identification of the recipient, or information on the type of message to be sent (for example, text file, video file, streaming video, voice). In addition, the assignment of the category value can be through the use of data tables or a categorization function for taking into account several parameters. Thus, preferably, the method according to the invention includes identifying a message category for the data message to be sent, said category identification comprising using, by the connected object, at least one categorization function for calculating a category value from characteristics of the data message to be sent.

Once the message to be sent has been categorized, the method includes a step of transmitting 420, by the connected object IoT1, the data message M1 to the available gateway which has, for the message category, the maximum priority level. In the case shown in FIG. 2, the category 1 has been assigned to the message M1. Thus, as previously mentioned, since it is the connection gateway GW2 of the sub-network 12 that has the highest priority level for this message category, the message M1 is transmitted by the connected object to the connection gateway GW2.

The Data Message M1 Issued by the Object IoT1 May Contain:
  the type of message (for example, the type "data" in the example considered here);
  a unique identifier of the sender (for example its IP address)
  a unique identifier of the recipient (for example its IP address)
  an application code identifying the sender application of the sent data message, and an incremented unique number of the message (in case the same message M1 is retransmitted);
  application data; as well as preferably,
    its expiry date; and
    a checksum ("Checksum" in English) for validating the integrity of the transmitted message.

Upon receipt of the message M1, the final recipient IoT2 transmits the message to the application it hosts. This application then returns an acknowledgment message A1 to the sender IoT1. The acknowledgment message A1 uses the same transport mechanism.

The acknowledgment message A1 may contain:
  the identifier of the sender (its IP address in the example);
  the recipient (its IP address in the example);
  the application code and the original message M1 unique number; as well as preferably
  its expiry date;
  the type of message, namely "acknowledgment" in this case; and,
  a checksum for validating the integrity of the transmitted acknowledgment message.

Each connected object manages a list of received messages. Thus, if a message already processed by the recipient object IoT2 is received again, it is simply acknowledged without further processing.

Messages not acknowledged after the expiry of the scheduled delivery period are automatically retransmitted by the sender object IoT1, and this period can be configured. Advantageously, the routing of the forwarded message M1 takes into account a possible update of the mesh of the local networks 11, 12, and 13 following the loss of connectivity of one or more gateways, for example. This is advantageous because if the failure to deliver the message M1 in the period allowed was caused by a problem at the gateway GW1, GW2, or GW3 by which the original message M1 was routed, then forwarding the message M1 can avoid the same problem. In other words, adapting the routing of the messages sent by the connected object IoT1 to any evolution in the connectivity of the available gateways prevents problems related to a failed gateway from recurring from one (re)transmission to another of the message not delivered to the final recipient within the allotted time.

With regard to the routing of each occurrence (when there are several due to retransmission, if any) of the data message M1 sent by the sender connected object IoT1, two distinct cases must be distinguished. These two cases differ according to the ranking of the priority levels P1.1, P1.2, P2.1, and P2.2 of the gateways GW1 and GW2, respectively, which allow the Internet connection of the sender connected object IoT1 to be established.

The data message M1 is transmitted by the sender connected object IoT1 to the one of the connection gateways which has the highest priority level, for transmission to the connected object IoT2. It should be noted that the highest level may correspond to a value that is either the lowest or the highest, depending on the prioritization calculation function.

If, for this message category, the gateway GW2 has a priority level P1.2 higher than the priority level P1.1 of the gateway GW1 (case P1.2>P1.1 for sending 420 in FIG. 2), the message M1 is transmitted in the step 420 to the highest priority gateway GW2. In fine, it reaches the recipient connected object IoT2 after transmission through the Internet 10, subject, of course, to its routing within the allotted time because it can be destroyed in transit by any network equipment (gateway, router) if its validity period has expired before it reaches the destination. The acknowledgment message A1 returned in 421 by the recipient connected object IoT2 to the sender connected object IoT1, then uses a connection that can be the same route back, that is to say also via the gateway GW2 (as in the example shown in FIG. 2), or it can be another route, depending on the routing algorithms implemented in the Internet network 10. Thus, the fact that access to the Internet network 10 was via the gateway GW2 for sending the data message M1 by the sender connected object IoT1 does not in any way constrain the establishment of the connection path for returning the corresponding acknowledgment message A1 from the recipient connected object IoT2.

In the opposite case where the gateway GW1 would have a priority level P1.1 higher than the priority level P1.2 of the gateway GW2, the message M1 would be transmitted to the highest priority gateway GW1. In fine, it would reach the recipient connected object IoT2 after transmission through the Internet 10. The acknowledgment message A1 returned by the recipient connected object IoT2 to the sender connected object IoT1 would then use a connection that here again can be the same route back, that is to say via the gateway GW1, or it can be another route, depending on the routing algorithm implemented in the global network.

As shown in FIG. 2B, in addition to these optional and advantageous procedures, a method 1 according to the invention may include a procedure 500 for categorizing messages to be transmitted. This categorization procedure 500 can be implemented by the connected objects such as the connected object IoT1.

This categorization procedure 500 includes in particular categorizing 510 a request Q1 to be sent by the connected object IoT1 sending said request. This categorization allows to define a category value C1 of the request Q1. This categorization may include in particular executing, by the connected object IoT1, at least one categorization function f for calculating a category value C1 of the request Q1 from message parameters of said request. The categorization procedure 500 also includes categorizing 520 the response R1 expected by the connected object IoT1 in order to define a category value C2 of the response. As mentioned above, this categorization 500 may include in particular executing, by the connected object IoT1, at least one categorization function f for calculating a category value C1 of the response R1 from message parameters of said response.

In an exemplary embodiment of a method 1 according to the invention shown in FIG. 2B, a categorization function f has been stored by the connected object IoT1 for use by said connected object for calculating two message categories C1, C2 (namely, one per request/response message) based on the message parameters of the request pQ1 and the response pR1. Alternatively, two categorization functions f1 and f2 could be used, provided that, for example, a first function f1 would be dedicated to the messages to be sent (namely, request) and a second function f2 would be dedicated to the messages to be received (namely, response). In FIG. 2B, these calculations have been symbolized in the balloons illustrating the steps 510 and 520, respectively, by the expressions C1=f(pQ1), and C2=f(pQ2), respectively. These calculations therefore use the function f based on message parameters of each request Q1 and response R1 message. Thus, the categories C1 and C2 that are obtained are truly comparable values. Indeed in this example, the message to be sent or request Q1 is classified in the category 1 while the response message R1 is classified in the category 2.

This categorization can be done, for example, depending on several message parameters, such as the size of the message to be transmitted, a type of application wishing to send such a message (identified for example by an application code), the identification of the recipient, or information on the type of message to be transmitted (for example, text file, video file, streaming video, voice). In addition, the assignment of the category value C1, C1 can be via the use of data tables or a categorization function f for taking into account several parameters. Thus, preferably, a method according to the invention includes identifying a message category C1, C2 for the data message to be sent, said category identification comprising using, by the connected object IoT1, at least one categorization function f for calculating a category value from characteristics of the message to be transmitted.

FIG. 2B also illustrates what can happen when the connected object IoT1 sends a request Q1 to another connected object, in this case to the connected object IoT2 of the local network 14. This is the step of sending 600 a request Q1 by the connected object IoT1.

This sending step 600 generally follows the categorization 500 of the messages to be transmitted by the connected object IoT1 described above. Such a categorization allows to assign a category value C1, C2 to said messages. Once the message to be transmitted has been categorized, a method according to the invention may include a step of transmitting 610, by the connected object IoT1, the request Q1 to the available gateway which has, for the message category C1, C2, the maximum priority level P1.1, P1.2, P2.1, P2.2. In the case shown in FIG. 2B, the category "one" C1 has been assigned to the message or request Q1. Thus, as previously mentioned, since it is the connection gateway GW2 of the sub-network 12 that has the highest priority level for this message category, the request Q1 is transmitted by the connected object IoT1 to the connection gateway GW2. In addition, the request Q1 thus transmitted (for example, transmitted message) includes an identifier of the gateway GW1 to be used for transmitting the response R1 to the connected object IoT1 and this identifier corresponds to the identifier of the gateway GW1 which has the maximum priority level P1.2 for the category value C2 of the response R1.

In particular, with reference to FIG. 2B, when the message category C1, C2 is considered, if P2.1>P1.1 and P1.2>P2.2, then the gateway GW2 with a priority level P2.1 will have priority on the gateway GW1 with a priority level P1.1 for the message category C1, while the gateway GW1 with a priority level P1.2 will have priority on the gateway GW2 with a priority level P2.2 for the message category C2.

Advantageously, the transmitted request Q1 also includes the port of the gateway GW1 (namely, response gateway) which has been dedicated to the connected object IoT1. Thus, this port can be used to transmit the response R1 to the response gateway GW1. Under these conditions, the response gateway GW1 will be able to quickly transmit the response message R1 to the connected object IoT1.

Preferably, the transmitted request Q1 may further include a time indication corresponding to a period during which the response R1 must be transmitted. This time indication can be coded, for example, according to international standards. In addition, the period may correspond to a specific day and time or to a time range during which the response R1 can be transmitted. Thus, the gateway with the highest priority level for transmitting the response R1 will retain said response message R1 until said specified period is reached. In addition, the time indication may correspond to a redundant period such as a given time every day of the week.

In addition, the transmitted request Q1 may have an expiry date. In this case, each gateway used to transmit the request Q1 performs an expiry date check and is configured to delete the messages that have expired.

In addition, a request Q1 issued by the object IoT1 may contain:
- a type of message (for example, the type "data" in the example considered here);
- a unique identifier of the sender (for example its IP address)
- a unique identifier of the recipient (for example its IP address)
- an application code identifying the sender application of the sent data message, and an incremented unique number of the message (in case the same message or request Q1 is retransmitted);
- application data; and/or
- a checksum ("Checksum" in English) for validating the integrity of the transmitted message.

Upon receipt of the message or request Q1, the final recipient IoT2 transmits the message to the application it hosts. This application then returns an acknowledgment message A1 to the sender IoT1. The acknowledgment message A1 may use the same transport mechanism as the request Q1. Alternatively, it may take a different path by applying the same data message routing principle and may therefore use the same transport mechanism as the response R1.

The acknowledgment message A1 may contain:
- the identifier of the sender (its IP address in the example);
- the identifier of the recipient (its IP address in the example);
- an application code and the unique number of the original message or request Q1; as well as preferably its expiry date;
the type of message, namely "acknowledgment" in this case; and/or,
a checksum for validating the integrity of the transmitted acknowledgment message.

Each connected object manages a list of received messages. Thus, if a message already processed by the recipient object IoT2 is received again, it is simply acknowledged without further processing.

Messages not acknowledged after the expiry of a scheduled delivery period, that can be optionally configured, are automatically retransmitted by the sender object IoT1. Advantageously, the routing of the retransmitted message or request Q1 takes into account a possible update of the mesh of the local networks 11, 12, and 13 following the loss of connectivity of one or more gateways, for example. This is advantageous because if the failure to deliver the message or request Q1 in the allotted time was caused by a problem at the gateway GW1, GW2, or GW3 by which the original message Q1 was routed, then retransmitting the message Q1 can avoid the same problem. In other words, adapting the routing of the messages sent by the connected object IoT1 to any evolution in the connectivity of the available gateways prevents problems related to a failing gateway from recurring from one (re)transmission to another of the message not delivered to the final recipient within the allotted time.

Following receipt of the message Q1 (namely, request), the final recipient IoT2 prepares and transmits 620 a response message R1 to the connected object IoT1. The response message R1 can use the same transport mechanism, except that the gateway used to transmit the response message R1 to the connected object IoT1 will be the gateway designated in the request Q1. That is to say, the gateway GW1, the priority level of which will be the highest for the response message category.

With regard to the routing of each occurrence (when there are several due to retransmission, if any) of the message or request Q1 sent by the sender connected object IoT1, two cases must be distinguished. These two cases differ according to the ranking of the priority levels P1.1, P1.2, P2.1, and P2.2 of the gateways GW1 and GW2, respectively, which allow the Internet connection to a main network, such as, but not limited to, the Internet, of the sender connected object IoT1 to be established.

The message or request Q1 is transmitted by the sender connected object IoT1 to the gateway that has the highest priority level, for transmission to the connected object IoT2. It should be noted that the highest level may correspond to a value that is either the lowest or the highest, depending on the prioritization calculation function.

If, for this message category, the gateway GW2 has a priority level P1.2 higher than the priority level P1.1 of the gateway GW1 (case P1.2>P1.1 for sending 610 in FIG. 2B), the message or request Q1 is transmitted in the step 610 to the highest priority gateway GW2. In fine, it reaches the recipient connected object IoT2 after transmission through the Internet 10, subject, of course, to its routing within the allotted time because it can be destroyed in transit by any network equipment (gateway, router) if its validity period has expired before it reaches the destination. An acknowledgment message A1 is returned in 611 by the recipient connected object IoT2 to the sender connected object IoT1, said acknowledgment message A1 then uses a connection that can be the same route back, that is to say said connection is also via the gateway GW2 (as in the example shown in FIG. 2B), or it can be another route, depending on the routing algorithms implemented in the Internet network 10.

Thus, the fact that access to the Internet network 10 was via the gateway GW2 for sending the message or request Q1 by the sender connected object IoT1 does not in any way constrain the establishment of the connection path for returning the corresponding acknowledgment message A1 from the recipient connected object IoT2.

The one skilled in the art will appreciate that the transmission of a data message by the sender connected object IoT1 occurs directly to the recipient connected object, that is to say without passing through any gateway and therefore without considering their respective priority levels, if said recipient connected object belongs to the same sub-network 11 or 12 as the sender connected object IoT1. This case is not shown in FIGS. 2A and 2B because it does not correspond to the implementation of the invention.

In short, the implementation of a method according to the invention allows to provide:
an auto-adaptive routing of messages, in the sense that it adapts, on the one hand, to the category of message to be sent and, on the other hand, to the connectivity status of the available connection gateways, if any, with said connectivity status being able to evolve, as previously described;
optimization of the costs of transporting messages since, at any time, the gateway used to establish the connection of a connected object from the local network to another connected object is the gateway that has the highest priority in that it offers the best overall connection characteristics for this message category; and
management of the validity period of the messages transmitted such as the implementations of protocols in connected mode of the prior art.

Another aspect of the invention relates to a computer program product comprising one or more sequences of instructions stored on a tangible memory medium, readable by a machine comprising a processor, said sequences of instructions being adapted to perform all the steps of a method according to the invention when the program is read in the memory medium and executed by the processor. Yet another aspect of the invention refers to a tangible recording medium, readable by a computer, storing the program in a non-transitory manner.

In the general context of IoT, the invention presents as a mechanism for transmitting data from a connected object adapted to be connected to a given sub-network to another connected object belonging to a different sub-network. This mechanism operates at the layer 4 of the open system interface, or OSI (from the English "Open System Interface) model, of the International Standard Organization or ISO (from the English: "International Standard Organization"). The layer 4 of the OSI model is the Transport layer, which is the first of the upper layers, directly above the three material layers: Physical, Link, and Network. Above the Transport layer are the other upper layers, namely, in this order, the Session, Presentation, and Application layers.

In this context, one of the main actors for the method for optimizing the use of sub-networks depending on the category of message to be sent described in the present invention is the connected object (the sender connected object) itself.

Thus, according to another aspect, the invention relates to a connected object adapted to be connected to several sub-networks, the connected object IoT1 being further adapted, and preferably configured, to implement said method for optimizing the use of sub-networks per category of message to be sent according to the invention.

In particular, as shown in FIG. 3, a connected object according to the invention includes a discovery module 10, a module 20 for assigning priority levels per message category to available gateways, and a module 30 for ranking the available gateways in order of their respective priority levels depending on the category of message to be sent. Such a connected object can then choose one of said available gateways for sending data messages depending on the category of message to be sent.

The discovery module 10 includes means for connecting the connected object to the available sub-networks, means for broadcasting a query message in the available sub-networks, means for receiving a response message sent by each of the available gateways in response to the query message. In particular, the response message contains gateway connectivity parameters and a validity period value of said connectivity parameters. The connection, broadcast, and reception means are communication means that may include characteristics known to the one skilled in the art. It can be any hardware and software arrangement capable of exchanging data between the connected object IoT1 and several gateways GW1, GW2, and GW3. The communication means further allow to transmit the data on at least one communication network and may comprise a wired or wireless communication. Preferably, the communication is operated via a wireless protocol such as 3G, 4G, and/or Bluetooth. These data exchanges may take the form of sending and receiving protocol messages. In addition, the communication means can be configured to allow communication with a remote terminal, including a client. In particular, the communication means may be configured to periodically update the message prioritization and/or categorization function(s). The communication means can also be configured to communicate with a human-machine interface. In particular, the discovery module 10 can be configured to issue a BCM-type query message that will allow each gateway that received the query message to send an appropriate response message to the connected object that sent/transmitted/issued a BCM-type query message.

The module 20 for assigning priority levels per message category to the available gateways includes a processor for performing at least one prioritization function, for calculating priority levels for each available gateway depending on the category of message to be sent. In addition, the module 20 for assigning priority levels may include or be coupled with other means, such as combinations of processors, memory, as well as codes supporting instructions.

Thus, each gateway will be associated with its own priority level per category of message to be sent, calculated with one or more prioritization functions included in the data memory of the connected object by the connected object, which allows to obtain values that are comparable with each other to define a priority level per category of message to be sent.

This or these prioritization functions, as well as the categorization function, can be acquired by the connected object via a call to one or more configuration files or to instructions transmitted from an interface (for example, graphical). Thus, the priority level assignment module 20 can be configured to receive and take into account prioritization functions, for example, stored in a memory such as a random access memory.

In particular, a connected object according to the invention is able, and preferably configured, to memorize one or more prioritization and/or categorization functions. For example, the storage module 50 is preferably configured to store one or more prioritization functions in order to be able to generate a priority level per category of message to be sent. To this end, the storage module 50 may include any computer-readable medium known in the art, including, for example, volatile memory, such as static random access memory (SRAM) and dynamic random access memory (DRAM), and/or non-volatile memory, such as read-only memory, flash memories, hard disks, optical discs and magnetic tapes. The storage module 50 may include a plurality of instructions or modules or applications to perform various functions. Thus, the storage module 50 can implement routines, programs, or matrix-type data structures. Preferably, the storage module 50 may include a medium readable by a computer system in the form of volatile memory, such as random access memory (RAM) and/or cache memory. The storage module 50, like the other modules, can for example be connected with the other components of the connected object IoT1 via a bus and one or more data carrier interfaces.

The available gateway ranking module 30 is advantageously configured to rank the gateways in order of their respective priority levels depending on the category of message to be sent. This allows the connected object to quickly select the most suitable available gateway for sending a data message.

In particular, the gateway ranking module is configured to associate a calculation function, called a prioritization function, to each category of message to be sent. These functions contain one or more gateway connectivity parameters as variables depending on the importance of these parameters for message transmission and assign them a coefficient of importance.

In addition, the connected object according to the invention may include a priority access management module 40. This module 40 includes in particular means 41 configured to categorize a message to be sent. It can be any hardware and software arrangement able to allow the assignment of a category value to the message to be sent. This module 40 also includes message transmission means 42, configured to send said data message to the available gateway that has the maximum priority level for the category value of the message to be sent. The data message is for example sent by a connected object to another connected object through at least one connection gateway.

A connected object IoT1 according to the invention can further include a module 50 for categorizing messages. This module 50 includes in particular means configured to categorize a message to be transmitted. It can be any hardware and software arrangement able to allow the assignment of a category value C1, C2 to said message to be transmitted.

This message categorization module 50 is in particular configured to categorize a request Q1 to be sent by the connected object IoT1 in order to define a category value C1 of the request Q1 and to categorize a response R1 expected by the sender connected object IoT1 in order to define a category value C2 of said response.

Advantageously, the message categorization module 50 is configured to execute at least one categorization function f for calculating the category values C1, C2 of the request Q1 and of the response R1 from message parameters of said request and said response.

In addition, each connected object can have a communication module configured to send a data message when the priority level ranking is complete. For example, a connected object according to the invention may include a network interface 60. This network interface includes in particular means configured for transmitting a request Q1 to an available gateway GTW2 having a maximum priority level P2.1 for the category value C1 of the request Q1, said transmitted request including an identifier of the gateway to be used for transmitting the response R1 to the connected object IoT1, said identifier corresponding to a gateway GW1 having a maximum priority level P1.2 for the category value C2 of the response.

This network interface 60 also includes means for transmitting the message or request Q1, configured to send said message Q1 to the available gateway that has the maximum priority level P1.1, P1.2, P2.1, P2.2 for the category value C1, C2 of the message to be transmitted. The message or request Q1 is for example sent by a connected object IoT1 to another connected object IoT2 through at least one connection gateway.

According to another aspect, the invention relates to a data communication system 2 comprising a connected object according to the invention. This system 2 is particularly suitable for the implementation of a method according to the invention. In addition, the system includes gateways GW1, GW2, GW3 accessible by a connected object according to the invention and the gateways can transmit a message sent by the connected object to another receiver, connected object located on another sub-network.

In particular, the gateways are configured to send a response message 131, 132 in response to the BCM query message of the connected object. These messages include in particular gateway connectivity parameters and a validity period value of said connectivity parameters.

The connection gateways are equipment allowing for communication, exchange and transport of data between connected objects. A gateway provides the connection between equipment in a local network, each associated with a local IP address, and main network services associated with public IP addresses. Thus, a same gateway can have at least two IP addresses. IP (Internet Protocol) protocol is the standard used by equipment connected to the Internet network to communicate with each other. This protocol uses an address (IP address) that allows the equipment on the network to be identified. More generally, an IP address is a unique number assigned to each piece of equipment connected to a computer network: gateway, computers, smartphones, Internet servers providing a service, objects connected to a local network . . . . This address allows the pieces of equipment on the network to be individually identified, and allows them to communicate with each other, and be connected to the Internet. There are two types of IP addresses, namely, on the one hand, public IP addresses and, on the other hand, local IP addresses.

The local IP addresses of an Ethernet-type wired local IP network (IEEE 802.3 standard), for example, or a Wi-Fi-type wireless local IP network (IEEE 802.11a/b/g/n/ac standard), for example, are managed at the local network, between the gateway connecting the local network to the Internet, and the pieces of equipment (computers, mobiles, connected objects . . . ) belonging to said local network. For example, a modem (namely, a box) from an Internet Service Provider (ISP) is an Internet connection gateway that has a specific local IP address by default. The local area network user equipment that is connected to the box to access the Internet through said box, has an IP address assigned individually by the box, as well as all objects connected to the local area network served by this box. It should be noted that local IP addresses are not present on the Internet because their function is only to allow data exchange between the Internet connection gateway and the local network equipment.

The IP address uses a specific format defined by the IP protocol. According to the format of the IP v4 (Internet Protocol Version 4) protocol, the IP address is composed of 4 groups of decimal digits, each representing a value between 0 and 255, and separated by the "dot" symbol (example: 92.169.1.25). Thus, the IP address range is potentially from 0.0.0.0.1 to 255.255.255.255.255. The IP v4 protocol is used for both local IP addresses and public IP addresses. It should be noted, however, that the IP v6 (Internet Protocol Version 6) format will replace the IP v4 format, according to which the IP address is composed of 8 groups of 4 hexadecimal characters, noted from 0 to 9, and from A to F, and separated by the "colon" symbol.

According to another aspect, the invention relates to a connected object adapted to access several gateways adapted to transmit a request sent by the connected object and to transmit a response to said request, the connected object being further able to implement a method for optimizing the use of gateways depending on categories of messages to be transmitted, and comprising to this end:
a message categorization module configured to:
categorize a request to be sent by the connected object in order to define a category value of the request, and
categorize a response expected by the connected object so as to define a category value of a response, and
a network interface configured to transmit the request to an available gateway having a maximum priority level for the category value of the request, said transmitted request including an identifier of the gateway to be used for the transmission of the response to the connected object, said identifier corresponding to a gateway having a maximum priority level for the category value of the response.

A connected object according to the invention allows to use gateways in an optimized way depending, on the one hand, on the messages to be transmitted and, on the other hand, on the evolution of the sub-network connectivity. In addition, such a connected object has the advantage of being able to operate with conventional gateways since calculations are performed at the connected object based on transmitted characteristics. Thus, thanks to the invention, it is possible to carry out auto-adaptive routing, optimize the cost of transporting messages, and manage the validity period of the transmitted messages. In addition, such a connected object according to the invention allows to take advantage of the multiplicity of the gateways to the Internet and the evolution over time of their connectivity.

According to another aspect, the invention relates to data communication system comprising a connected object according to the invention, said system further including gateways accessible by said connected object for transmitting a query message and wherein the gateways are configured to send a presentation message in response to the query message transmitted by the connected object, said presentation messages containing gateway connectivity parameters.

The present invention has been described and illustrated in the present detailed description and in the figures of the accompanying drawings, in possible embodiments. The present invention is not limited, however, to the embodiments shown. Other variants and embodiments may be deduced and implemented by the person skilled in the art upon reading the present description and the accompanying drawings.

As described, the present invention provides solutions allowing an optimized and auto-adaptive routing of messages of a connected object, taking into account, on the one hand, the message to be sent and, on the other hand, the connectivity status of all available connection gateways. Thus, contrary to the state of the art, the present invention allows to take advantage, in particular, on the one hand, of the diversity of characteristics of the messages to be sent and, on the other hand, of the multiplicity of the gateways of a sub-network and the evolution over time of their connectivity.

What is claimed is:

1. A method for optimizing use of gateways depending on a category of message to be sent by a connected object, said connected object being able to access several gateways adapted for transmitting a message sent by the connected object, said method comprising:
   a procedure for discovering, by the connected object, gateways available for the connected object, said procedure for discovering comprising:
      broadcasting, by the connected object, a query message in several data transport sub-networks, and
      receiving, by the connected object, response messages sent by each of the gateways available in response to the query message, said response messages containing gateway connectivity parameters and a validity period value of said gateway connectivity parameters;
   a procedure for assigning priority levels to the gateways available per category of message to be sent, said procedure for assigning priority levels comprising executing, by the connected object, at least one prioritization function, for calculating said priority levels for each gateway from the gateway connectivity parameters and depending on the category of message to be sent; and
   a procedure for ranking, by the connected object, the gateways available in order of their respective priority levels depending on the category of message to be sent, with an objective of choosing one of said gateways available for sending data messages.

2. The method according to claim 1, further comprising, when the connected object as a sender connected object initiates a step of sending a data message:
   categorizing the data message to be sent by the sender connected object, to assign a category value to said data message, and
   transmitting the data message by the sender connected object to an available gateway which comprises a maximum priority level for the category of message to be sent.

3. The method according to claim 1, further comprising a step of updating the priority levels, said updating includes broadcasting or transmitting, by at least some of the gateways available, new connectivity parameters to the connected object, and automatically updating the priority levels of said gateways available by the connected object.

4. The method according to claim 3, wherein the updating further includes transmitting, by the connected object, an update message to said at least some of the gateways available, recipient gateways being selected depending on the validity period value of the gateway connectivity parameters associated therewith.

5. The method according to claim 1, wherein the priority levels of the gateways available per message category are stored in a memory of the connected object.

6. The method according to claim 1, wherein the priority levels of the gateways available per message category are transmitted by the connected object to other connected objects.

7. The method according to claim 1, wherein the gateway connectivity parameters specific to each gateway which are taken into account, by the connected object, for calculating the priority levels, include one or more of: a connectivity type, a data transport cost per unit of data, a connectivity quality index, a latency time, and a transmission rate associated with a gateway of a network.

8. The method according to claim 1, wherein, when the connected object initiates a procedure for sending a request:
   a procedure for categorizing messages to be transmitted, including categorizing the request to be sent by the connected object so as to define a category value of the request and categorizing a response expected by the connected object so as to define a category value of the response, the categorizing includes executing, by the connected object, at least one categorization function, for calculating the category value of the request and the response from message parameters of said request and said response, and
   transmitting the request by the connected object to an available gateway comprising a maximum priority level for the category value of the request, said request that has been transmitted including an identifier of the available gateway to be used for transmitting the response to the connected object, said identifier corresponding to said available gateway comprising said maximum priority level for the category value of the response.

9. The method according to claim 8, wherein the request that has been transmitted further includes a time indication corresponding to a period during which the response must be transmitted.

10. The method according to claim 8, further comprising a prior procedure for assigning, by each of the gateways, a fixed IP address to the connected object and a dedicated port to said fixed IP address, wherein all of said response messages received on said dedicated port are transmitted to the connected object at a previously assigned fixed IP address.

11. The method according to claim 10, wherein the request that has been transmitted includes the dedicated port to the connected object of a gateway to be used for transmitting the response.

12. The method according to claim 8, wherein message characteristics specific to each message to be transmitted and taken into account by the connected object for categorizing the message, include one or more of: a size of the message, an index relating to an urgency of the message and a format of any objects associated with the message.

13. A connected object adapted to be connected to several sub-networks, the connected object being further adapted to implement a method for optimizing a use of available gateways depending on a category of message to be sent, and comprising:
   a discovery module including:
      means for broadcasting a query message in available sub-networks; and
      means for receiving a response message sent by each of the available gateways in response to the query message, said response message containing gateway connectivity parameters and a validity period value of said gateway connectivity parameters; and,
   a module for assigning priority levels, to the available gateways, per message category, including a processor for performing at least one prioritization function, for calculating said priority levels for each available gateway from the gateway connectivity parameters and depending on the category of message to be sent; and a module for ranking the available gateways in order of respective priority levels depending on the category of message to be sent, with an objective of choosing one of said available gateways for sending data messages.

14. The connected object according to claim 13, further comprising a priority access management module including: means for categorizing a message to be sent, configured to assign a category value to said message, and transmission means configured to transmit the message to be sent to an available gateway which comprises a maximum priority level for the category value of the message to be sent.

15. A data communication system comprising:
a connected object adapted to be connected to several sub-networks, the connected object being further adapted to implement a method for optimizing a use of available gateways depending on a category of message to be sent, said connected object comprising:
a discovery module including:
means for broadcasting a query message in available sub-networks; and
means for receiving a response message sent by each of the available gateways in response to the query message, said response message containing gateway connectivity parameters and a validity period value of said gateway connectivity parameters; and, a module for assigning priority levels, to the available gateways, per message category, including a processor for performing at least one prioritization function, for calculating said priority levels for each available gateway from the gateway connectivity parameters and depending on the category of message to be sent; and a module for ranking the available gateways in order of respective priority levels depending on the category of message to be sent, with an objective of choosing one of said available gateways for sending data messages, said data communication system further comprising gateways accessible by said connected object for transmitting said response message and wherein the gateways are configured to send said response message in response to the query message of the connected object, said response message containing said gateway connectivity parameters and said validity period value of said gateway connectivity parameters.

* * * * *